(12) United States Patent
Kim et al.

(10) Patent No.: US 12,511,920 B2
(45) Date of Patent: Dec. 30, 2025

(54) APPARATUS AND METHOD FOR IDENTIFYING POLLEN THROUGH LEARNING

(71) Applicant: FARMCONNECT CO.,LTD., Daejeon-si (KR)

(72) Inventors: Mu Hyun Kim, Paju-si (KR); In Seok Jeong, Seoul (KR)

(73) Assignee: FARMCONNECT CO., LTD., Daejeon-si (KR)

(*) Notice: Subject to any disclaimer, the term of this patent is extended or adjusted under 35 U.S.C. 154(b) by 323 days.

(21) Appl. No.: 18/342,037

(22) Filed: Jun. 27, 2023

(65) Prior Publication Data

US 2024/0273928 A1    Aug. 15, 2024

(30) Foreign Application Priority Data

Feb. 14, 2023  (KR) .................. 10-2023-0019250

(51) Int. Cl.
*G06V 20/69* (2022.01)
(52) U.S. Cl.
CPC .......... *G06V 20/698* (2022.01); *G06V 20/695* (2022.01)
(58) Field of Classification Search
CPC .... G06V 20/698; G06V 20/695; G06V 10/56; G06V 10/82; G06V 20/52; G06V 10/44; G06V 10/422; G06V 10/12; G06V 10/467; G06V 10/774; G06T 2207/10024; G06T 2207/20081; G06T 2207/20084; G06T 7/73; G06T 7/62; G06T 7/90; G06T 2210/12; A01K 47/06; A01K 29/00; A01K 67/30; A01H 1/027; G06N 3/08

See application file for complete search history.

(56) References Cited

U.S. PATENT DOCUMENTS

| | | | |
|---|---|---|---|
| 2016/0353715 A1* | 12/2016 | Temby | A01K 47/06 |
| 2020/0315143 A1* | 10/2020 | Radzyner | A01K 51/00 |
| 2022/0183266 A1* | 6/2022 | Janssen | A01M 7/0089 |
| 2022/0211013 A1* | 7/2022 | Temby | A01K 47/06 |
| 2022/0361471 A1 | 11/2022 | Patch et al. | |
| 2023/0237698 A1* | 7/2023 | Villalpando | G06T 7/73 |
| | | | 701/409 |

FOREIGN PATENT DOCUMENTS

| | | |
|---|---|---|
| CN | 115220132 A | 10/2022 |
| EP | 3789934 A1 | 3/2021 |
| KR | 10-2016-0141224 A | 12/2016 |
| KR | 10-1963648 B1 | 4/2019 |

OTHER PUBLICATIONS

Steinbock, Lorenz, "Extended European Search Report" for EP Application No. 23180647.2, Dec. 4, 2023, EPO, Munich, Germany.

(Continued)

*Primary Examiner* — Tom Y Lu
(74) *Attorney, Agent, or Firm* — Bridgeway IP Law Group, PLLC; Jihun Kim

(57) ABSTRACT

An apparatus and a method for identifying pollen are proposed. Particularly, the apparatus and method accurately identify the presence and quantity of pollen on bees by utilizing a deep learning model trained on the characteristics of the morphology and color of bees and pollen.

10 Claims, 11 Drawing Sheets

(56) References Cited

OTHER PUBLICATIONS

Marstaller, Julian et al., "Deepbees-building and scaling convolutional neuronal nets for fast and large-scale visual monitoring of bee hives.", Proceedings of the IEEE/CVF International Conference on Computer Vision Workshops, 2019.

Yang, Cheng et al., "Deep learning for pollen sac detection and measurement on honeybee monitoring video.", 2019 International Conference on Image and Vision Computing New Zealand (IVCNZ), pp. 1-6, IEEE, 2019.

Benahmed, Hadi Kouider et al., "Detection and tracking of honeybees using YOLO and StrongSORT.", 2022 2nd International Conference on Electronic and Electrical Engineering and Intelligent System (ICE3IS), pp. 18-23, IEEE, 2022.

Yang, Cheng et al., "A model for pollen measurement using video monitoring of honey bees.", Sensing and Imaging, 19, 2018, pp. 1-29.

* cited by examiner (Normal case)
Entering the hive (Abnormal case) Dying

APPARATUS AND METHOD FOR IDENTIFYING POLLEN THROUGH LEARNING

CROSS-REFERENCE TO RELATED APPLICATION

This application is based on and claims priority to Korean Patent Application No. 10-2023-0019250 filed on Feb. 14, 2023, with the Korean Intellectual Property Office, the disclosure of which is incorporated herein by reference in its entirety.

TECHNICAL FIELD

The present invention relates to an apparatus and method for identifying pollen. Particularly, it relates to an apparatus and method that accurately identifies the presence and quantity of pollen on bees by utilizing a deep learning model trained on the characteristics of the morphology and color of bees and pollen.

BACKGROUND

Honey bees are bees used for the purpose of storing and producing honey, while bumble bees are bees used for pollination, specifically for the purpose of gathering pollen through buzz pollination.

Buzz pollination refers to the behavior of vibrating their thoracic muscles to collect pollen on their hairy bodies, which transfers pollen to the stigma of flowers.

Therefore, bumble bees are commonly used to pollinate crops such as tomatoes, eggplants, peppers, and other plants of the Solanaceae family that do not produce honey. They are also widely used for cultivating crops such as peaches, plums, apples, apricots, strawberries, cantaloupes, pears, blueberries, raspberries, mangos, and more.

For example, in tomato cultivation, it is known that when bumble bees are introduced, about 10-20% of the worker bees collect pollen 5-12 times per day, visiting 50-220 flowers during each collection activity.

However, excessive pollination due to excess bees compared to the number of flowers can lead to deformities and poor fruit development. To control the pollination activity of bumble bees, hive entrances and exits are equipped separately, and their opening and closing are adjusted according to the time of day and bee activity.

As time passes after the beehive installation, the population of bumble bees decreases and their movement slows down, indicating the need to replace the beehive. Additionally, when the temperature exceeds 30 degrees Celsius, more bees stay inside the hive to maintain a lower temperature for ventilation purposes, reducing their pollination activity. Once the temperature exceeds 33 degrees Celsius, the bees enter survival mode, eliminating larvae and ceasing pollination activity. To monitor such conditions, a bumble bee management technique has been proposed, which remotely monitors the status of bumble bees.

In South Korea, there are published patents such as Korean Patent Publication No. 10-2016-0141224, "Bumble Bee Management Device and Management System," published on Dec. 8, 2016, which discloses a technology that uses a sensor to detect the frequency of bumble bees entering and leaving through the hive entrance, providing information on the timing of bumble bee replacement. Another patent, Korean Patent No. 10-1963648, "Greenhouse Bumble Bee Management System and Method, Bumble Bee Box," published on Apr. 1, 2019, discloses a technology that uses multiple sensors to detect the direction and frequency of bumble bees entering and leaving the bumble bee box, enabling control of the opening and closing of the entrance of the bumble bee box.

However, the effectiveness of the conventional technologies is limited to identifying bumble bees, and they do not address the analysis of the quantity of pollen on bees, the suitability of bumble bee pollination activities, or the provision of information necessary for beehive and greenhouse management.

DISCLOSURE OF INVENTION

Problems to be Solved by the Invention

To address the aforementioned issues, the present invention aims to provide an apparatus and method for tracking the trajectory of bees by comparing their movements captured near the beehive with training data.

Furthermore, the present invention aims to provide an apparatus and method for analyzing the amount of pollen collected by bees, the suitability of their pollination activities, and the health status of bees using captured videos.

Moreover, the present invention aims to provide an apparatus and method for determining the suitability of pollination activities of bees and deciding the replacement timing of beehives by analyzing the trajectory of bees and the condition of pollen in the captured videos.

Means for Solving the Problem

To achieve the above objectives, the apparatus and method for identifying pollen through learning in accordance with some embodiment of the present invention includes: a storage unit that stores trained data obtained by training a deep learning model with the morphological characteristics of bees and pollen; and a control unit that uses a captured video and the stored trained data to identify bees and pollen in the captured video.

Furthermore, the control unit detects boundaries through image processing of the captured video and identifies the boundaries predicted to be pollen as the contour lines of the pollen.

The training data includes trained data for various types of bees and pollen. The control unit uses the trained data to set bee boxes in areas estimated to be bees and pollen boxes in areas estimated to be pollen, thus identifying bees and pollen separately.

Moreover, the control unit identifies the presence of pollen based on the intersection-over-union (IoU) value of the pollen box and the bee box.

The control unit detects boundaries through image processing of the captured video, identifies the boundaries predicted to be pollen as the contour lines of the pollen, and considers only the contour lines within the pollen box as pollen.

Otherwise, the control unit detects boundaries through image processing of the captured video, identifies the boundaries predicted to be pollen as the contour lines of the pollen, and considers only the contour lines within the bee box as pollen.

On the other hand, the control unit considers the pollen box valid only if at least a portion of the pollen box exists inside the bee box while ignoring the pollen box located outside the bee box.

Furthermore, the control unit performs image processing on the captured video to detect boundaries and identifies the boundaries predicted to be pollen as the contour of the pollen, and only the contours within the valid pollen box are considered as pollen.

Additionally, the control unit sets the contour lines as a baseline for determining the color or concentration of the pollen.

The control unit defines a rectangle inscribed in the contour lines and sets the interior of the rectangle as the target area for determining the color or concentration of the pollen.

The control unit determines the presence of pollen based on at least one of the following: the area ratio (R) of the bee box and pollen box, the curvature (E) of the contour lines, the difference (D) between the color of the pollen and the background color, and the color ratio (P) within the contour lines.

Otherwise, the control unit determines the presence of pollen based on at least one of the following: the area ratio (R) of the bee box and pollen box, the curvature (E) of the contour lines, the difference (D) between the color of the pollen and the background color, and the color ratio (P) within the rectangle.

Furthermore, the control unit quantitatively determines the concentration or quantity of the pollen by applying binarization to the image within the pollen box to standardize the color values and analyzing the standardized values through numerical integration.

The control unit sets the color values outside the contour lines in the pollen box to '0' during the binarization process.

The control unit displays the distribution of pollen in three dimensions by representing the color concentration of the image within the pollen box along the Z-axis.

The apparatus of the present invention further includes a camera unit for capturing the video; and a display unit for displaying the video. The control unit displays the bee boxes, pollen boxes, and contour lines on the display unit.

Effects of the Invention

According to the present invention, an apparatus and a method are provided that track the trajectory of bees by comparing the movement of bees captured near the beehive with training data.

Furthermore, according to the present invention, an apparatus and a method are provided that analyzes the amount of pollen collected by bees, the suitability of their pollination activities, and the health status of bees using captured videos.

Moreover, according to the present invention, an apparatus and a method are provided that determine the suitability of pollination activities of bees and decide the replacement timing of beehives by analyzing the trajectory of bees and the condition of pollen in the captured videos.

DESCRIPTION OF THE INVENTION

Figure 1:
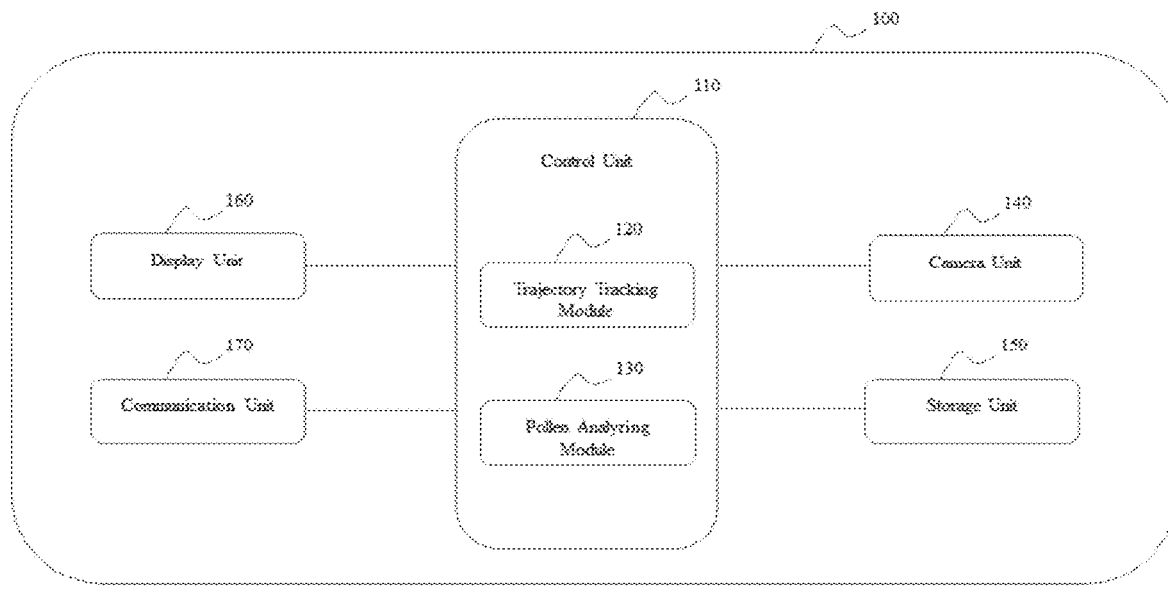
FIG. 1 is a schematic diagram illustrating the configuration of an apparatus for identifying pollen through learning according to some embodiment of the present invention.

The advantages, features, and methods for achieving them in the present invention will be clearly understood by referring to the detailed explanation of the embodiments provided with the accompanying drawings. However, the present invention is not limited to the embodiments disclosed herein, as it can be implemented in various other forms. The disclosed embodiments are provided to fully disclose the invention to those skilled in the technical field to which the invention belongs. The same reference numerals throughout the specification denote the same components.

The terms used in this specification are merely used to describe specific embodiments and are not intended to limit the invention. Unless otherwise clear from the context, plural expressions encompass singular expressions. In this specification, terms such as "including" or "having" are intended to indicate the presence of the features, numbers, steps, operations, components, or sub-components as listed in this specification, rather than excluding the presence or possibility of one or more other features, numbers, steps, operations, components, or sub-components, or their combinations.

In this specification, terms such as "part," "module," "device," "terminal," "server," or "system" are intended to refer to hardware, software or a combination of both. For example, the hardware may be a data processing apparatus, including a CPU or other processor. Additionally, the software operated by the hardware may refer to running processes, objects, executables, threads of execution, programs, or similar entities.

Hereinafter, a detailed description of a preferred embodiment of the present invention will be provided with reference to the accompanying drawings.

FIG. 1 is a schematic diagram illustrating the configuration of an apparatus for identifying pollen through learning according to some embodiment of the present invention.

The apparatus (100) is configured to include a control unit (110) that tracks the trajectory of bees and analyzes the collected pollen amount through a trajectory tracking module (120) and a pollen analyzing module (130), and a storage unit (150) that stores the trained data obtained by training various information about bees and pollen using a deep learning model.

It may further include a camera unit (140) for capturing the movement of bees near the beehive, a display unit (160) for displaying the captured videos, and a communication unit (170) for performing wired or wireless communication with external devices.

If an external camera (not shown) is used instead of the built-in camera unit (140), the apparatus (100) can perform data transmission with the external camera through the communication unit (170). An external display device (not shown) can be used instead of the built-in display unit (160) of the apparatus (100), or it can be used in conjunction with the built-in display unit (160).

The apparatus of the present invention learns (or trains) the characteristics of bumble bees, such as body structure or color distribution, using a deep learning model, and stores the trained data in the storage unit (150). It compares the streaming video data received from the camera unit (140) and then stored in the storage unit (150) with the trained data pre-stored in the storage unit (150) on a frame-by-frame basis to detect bumble bees in the video, track their movement paths, identify pollen, and analyze the amount of pollen.

Figure 2:
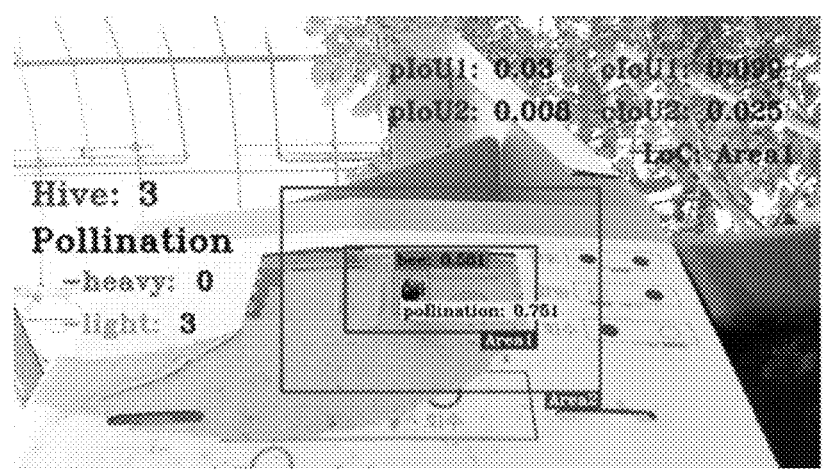
FIGS. 2 to 4 are screenshots obtained by the apparatus for identifying pollen through learning according to some embodiment of the present invention.
Figure 3:
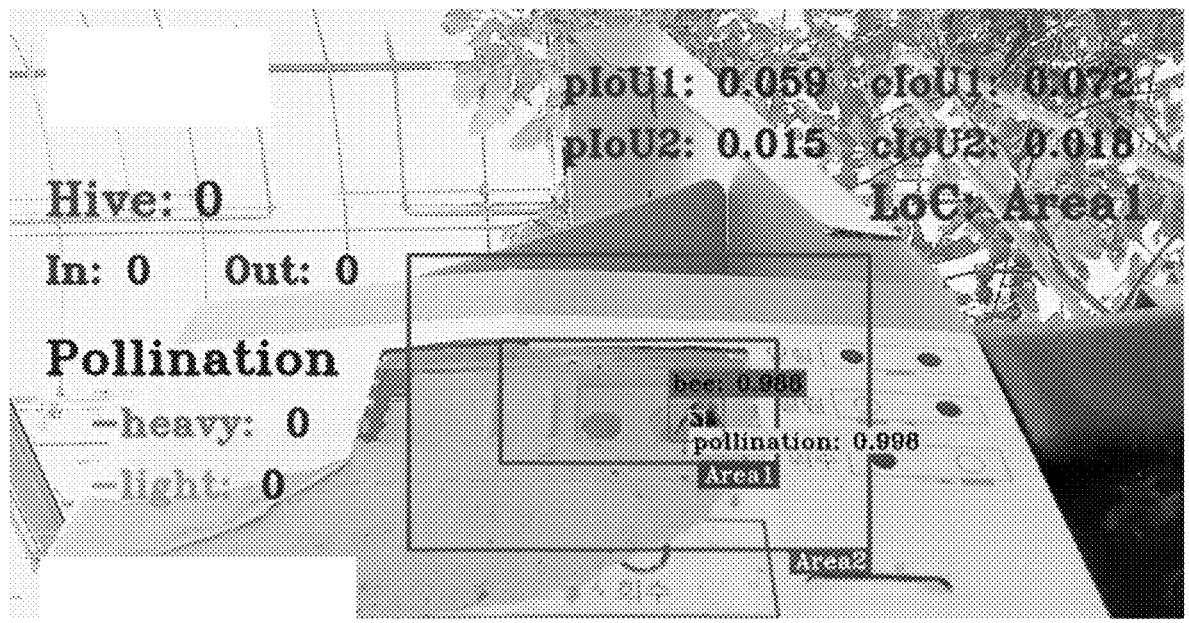
Figure 4:
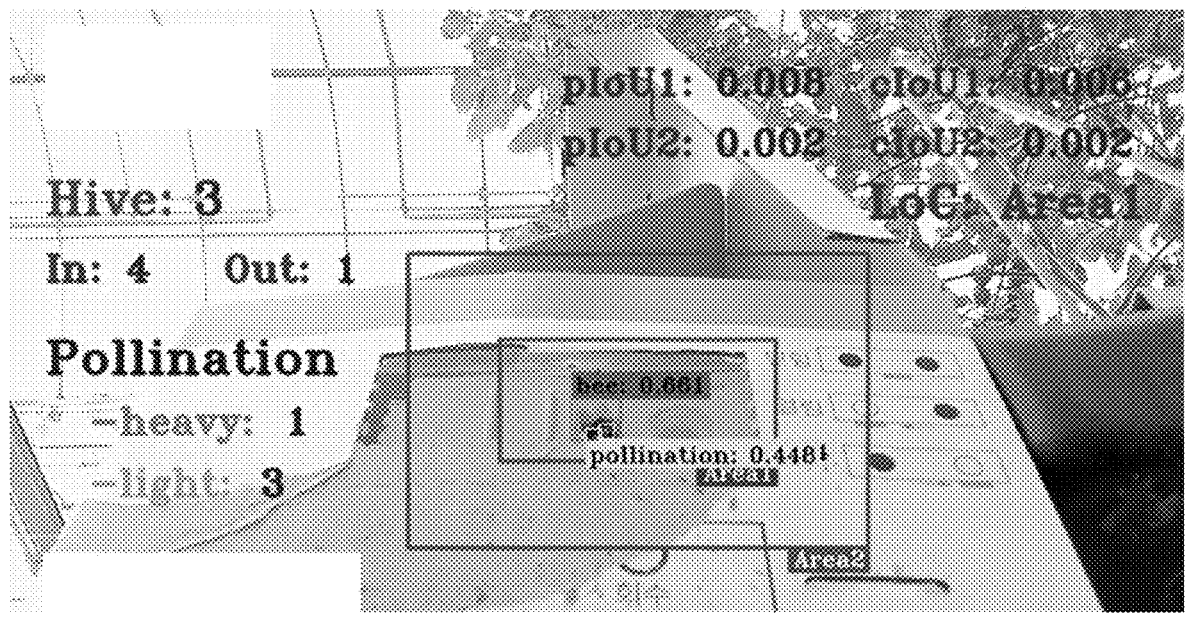

FIGS. 2 to 4 are screenshots obtained by the apparatus for identifying pollen through learning according to some embodiment of the present invention.

The display screen provided by the apparatus of the present invention may have a configuration shown in FIG. 2.

In general, the recognition of bumble bees is performed by calculating the intersection over union (IoU) between a plurality of virtual square boxes (referred to as "gates") near the entrance of the beehive and square boxes for bees (referred to as "bee boxes") automatically drawn when bees are recognized.

In FIG. 2, the gates are defined to distinguish Area 1 (i.e., inside the red gate), Area 2 (i.e., inside the blue gate), and Area 3 (i.e., outside the blue gate), and bee boxes (i.e., green boxes) are defined around the bees.

The apparatus of the present invention records or tracks the occurrence order of intersections between the gate's interior area and the bee box to distinguish whether the bee is entering or leaving the beehive.

For example, if the movement of the bee box (or the intersection between the bee box and the gate) is recorded in the order of Area 1→Area 2→Area 3, it indicates that the bee is leaving the beehive. If it is recorded in the order of Area 3→Area 2→Area 1, it indicates that the bee is entering the beehive. If the bee stays in Area 1 for a while and then disappears, it is considered to have entered the beehive.

In FIG. 2, "Hive" indicates the number of bees inside the beehive, which is calculated by counting the number of entries and exits of bees.

"Pollination" represents the amount of pollen collected by bees, where "heavy" indicates abundant pollen collection and "light" indicates relatively insufficient pollen collection.

"LoC" indicates in which area the bee (or bee box) is located.

On the other hand, the definition of IoU (Intersection over Union), which is a metric used to evaluate the accuracy of object detection in the present invention, is as follows.

$$IoU = \frac{\text{Intersection of the gate area and the bee box area}}{\text{Union of the gate area and the bee box area}}$$

The calculated intersection over union (IoU) values, 'pIoU1,' 'pIoU2,' 'cIoU1,' and 'cIoU2', are displayed on the upper right part of the screen of FIG. 2. The prefixes 'p' and 'c' represent the past and current values, respectively.

'pIoU1' represents the value measured in the previous frame for Area 1 (i.e., inside the red gate), 'pIoU2' represents the value measured in the previous frame for Area 2 (i.e., inside the blue gate), 'cIoU1' represents the value measured in the current frame for Area 1, and 'cIoU2' represents the value measured in the current frame for Area 2, respectively.

In addition to IoU, other values such as 'Hive' and 'Pollination' are also updated for each frame of the video.

The recognition of bees and pollen is performed by comparing the captured video with the stored trained data. In bee detection, the IoU (Intersection over Union) is calculated between the area where the bee belongs (Area 1, 2, or 3) and the bee box, while in pollen detection, the IoU is calculated between the bee box and the pollen to initially differentiate the presence of pollen.

The probability of an object in the video, such as a bee or pollen, being identified as a bee or pollen can be represented numerically near the bee box or pollen box. For example, if the number '0.99' is displayed next to the bee box, it means that the object has a 99% probability of being identified (or predicted) as a 'bee.'

The pollen box is generated within the bee box, and the numerical value displayed next to the pollen box represents the probability of the overlapping pollen image being predicted (or identified) as pollen.

To find the predicted pollen region, image preprocessing is performed to draw contours on the corresponding area. The color and concentration (i.e., the proportion of pixels occupied by a specific color) within the contour are calculated. To identify pollen, which can vary in color depending on the flowers bees gather from, the method involves drawing contours around the areas recognized as pollen and calculating the average color and concentration within those contours.

If there is a certain correlation between the distribution of pollen on the bee's body and the bee's pollen foraging level, a criterion for classifying the bee's pollen foraging level can be established based on the shape and the curvature radius of the contour. For example, if the contour is elliptical or the pollen distribution area is relatively large, it indicates that the bee's pollen foraging is insufficient or inadequate, while if the pollen distribution area is small and closer to a circle, it indicates that the bee's pollen foraging is vigorous and active.

FIG. 3 shows a case where the amount of pollen collected by a bee is numerically expressed (e.g., 0.998) when it exceeds a certain criterion and is relatively sufficient (or heavy), and FIG. 4 represents a different case where the amount of pollen collected by a bee is numerically expressed (e.g., 0.448) when it is below the certain criterion.

Figure 5:
FIGS. 5 to 7 are screenshots of pollen images obtained by the apparatus for identifying pollen through learning according to some embodiment of the present invention.
Figure 6:
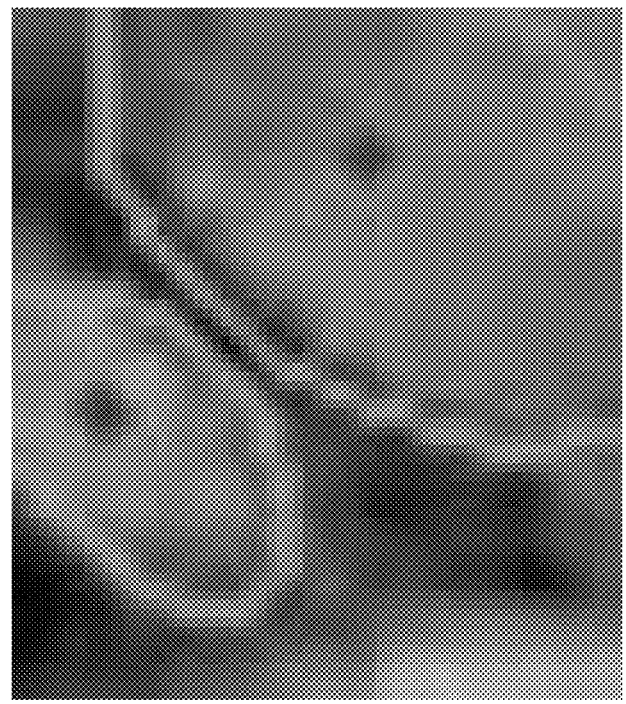

FIG. 5 illustrates the pollen image when the amount of pollen is sufficient, as shown in FIG. 3. Pollen is displayed in a relatively distinct bright color with clear boundaries. FIG. 6 represents the pollen image when the amount of pollen collected by a bee is relatively insufficient, as depicted in FIG. 4. Pollen is displayed in a relatively faint or dark color with blurred boundaries, dispersed across multiple regions, or distributed over a wide area within the contour.

Figure 7:
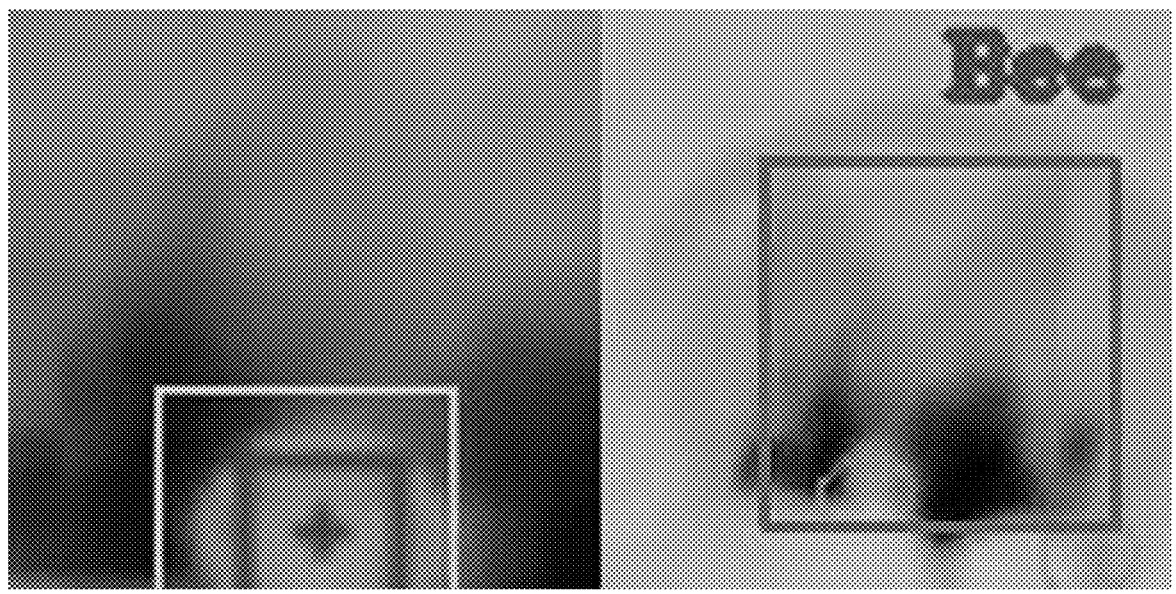

Referring to FIG. 7, the method of identifying pollen and measuring the amount of pollen will be explained.

When an area is predicted to be pollen, a green contour line is generated around it. By applying image processing techniques, the boundary is detected and displayed as a contour line. However, relying solely on boundary detection can lead to cases where areas that are not actually pollen are included.

Therefore, it is necessary to use training data for the shape of pollen. By using trained data for pollen, a pollen box (i.e., yellow rectangle on the left side of the image) is set in the area predicted as pollen. By generating the contour line only within the pollen box, the accuracy of pollen identification can be improved.

For bees, a similar approach can be used by using training data for bees. A bee box (blue rectangle on the right side of the image) is set in the area predicted as a bee. Only the contour lines within the bee box are recognized as pollen. In the right image, the inside and outside of the bee box have green contour lines, but only those on the bee's body should be considered pollen. Therefore, the green contour lines outside the bee box should be ignored.

In the left image, a green contour line is formed within the pollen box. Green contour lines formed outside the pollen box should also be ignored. In summary, bee and pollen boxes are created independently. The interior area of the contour line shall be recognized as pollen only when the pollen box is within the bee box and the contour line is inside the pollen box. That is, the contour lines define the criteria for determining the color and concentration of pollen.

In addition, the green contour lines outside the bee box in the right image can be interpreted as false pollen. In this case, the Intersection over Union (IoU) value for the pollen area over the bee box area can be used to correct the identification result for the presence of pollen. The green contour lines on the right that are mostly or completely outside the bee box have a very low IoU value or no IoU value.

Classification tasks using deep learning models are widely applicable in various fields as long as high-quality training data is available. However, the critical aspect of the present invention lies in the algorithm-based classification of objects, not just simple learning and prediction.

The present invention presents a new methodology in terms of improving and enhancing predictive models. When training the deep learning model with images of various objects such as bees, honeybees, pollen, etc., the annotations (class types: bees, honeybees, pollen, etc.) and features (shape, color distribution, concentration, etc.) of the object images are learned together. The accuracy of the model can be calculated based on the features of the trained images for each class.

Even though it is possible to achieve the best quality results by accurate training and prediction for the entire captured video, it requires handling a large amount of data and considering the performance and efficiency of the computer. To address this issue, a method of annotating only the object requiring identification is used. The apparatus of the present invention is designed to show high efficiency even with relatively low computing performance by training only the representative features of each object or class instead of comprehensive training for each object. It is also designed to increase reliability by applying the IoU value to the classification of different classes (i.e., bees and pollen).

The training data is used to provide accuracy for each object (bee or pollen). Therefore, the prediction accuracy for objects with complex or intricate structures, such as insects, is heavily influenced by the quality of the input image during training. For fast-moving objects like bees, image quality is greatly affected by the camera's resolution, ambient brightness, and the movement of the object itself. As a result, there is a possibility of misidentifying areas that are not of interest, i.e., areas where pollen does not actually exist, as pollen.

Therefore, to address this issue, the present invention applies an algorithm for detecting the color of pollen. To accomplish this, only the areas recognized as pollen by the trained data are separated through image preprocessing. Colors are typically represented in RGB (red, green, blue), which are then converted to a binary spectrum ranging from black to white using a binarization technique, achieving a 1:1 correspondence. Details about the binarization technique will be described later.

In many cases, beehives have a yellow color like pollen, which can lead to misidentifying the areas around the beehive entrance as pollen. To prevent this, an algorithm can be used to verify the presence of pollen by extracting and comparing the colors around the beehive.

Even if the same object is captured in an image, it can be perceived differently depending on the surrounding brightness. This problem can be mitigated by using the color of the beehive as a reference for correction. That is, the apparatus of the present invention periodically captures the beehive to remove colors that can be mistaken for pollen instead of adjusting the surrounding brightness based on time (or the position of the sun based on latitude and longitude).

This will be explained further with reference to FIG. 8.

Figure 8:
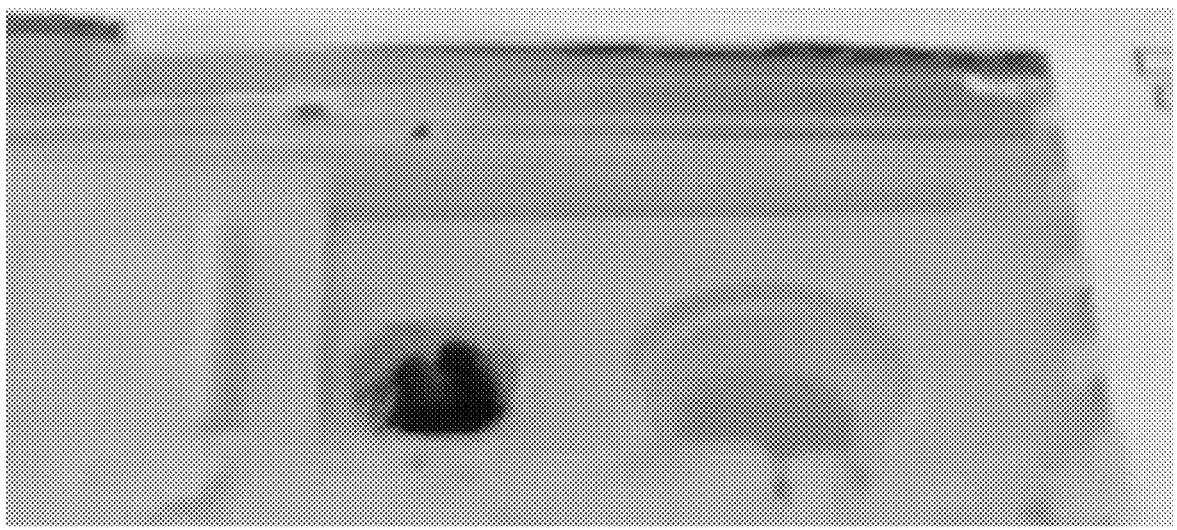
FIG. 8 shows an example of a bee box used in conjunction with the apparatus for identifying pollen through learning according to some embodiment of the present invention.

For example, in FIG. 8, the main color of the beehive is yellow. If pollen also has a predominantly yellow color, the colors of the beehive and pollen can be confused. In such cases, the color value of the beehive is used as the reference color for color similarity testing to determine whether the identified object is pollen.

It is assumed that the colors of pollen and the beehive are similar but not identical. While the color of the beehive is uniform within a certain area, the color of pollen can be non-uniform depending on its distribution. Therefore, this assumption is appropriate.

When an object that is estimated to be pollen in a certain area is identified, its interior color within the contour is compared to the color of the beehive. If the similarity between them is very high (e.g., the color difference is less than 20%), it is considered as the beehive area rather than pollen. If the similarity falls within a certain range (e.g., the color difference between 20% and 40%), it is considered pollen. If the similarity is low (e.g., color difference exceeds 40%), it is considered as either a very small amount of pollen or no pollen at all. The threshold values expressed in percentages (i.e., criteria) can be changed through data updates and training.

The methodology of using the background color as the reference to accurately identify the color of pollen or the bee can be applied regardless of the specific color.

Figure 9:
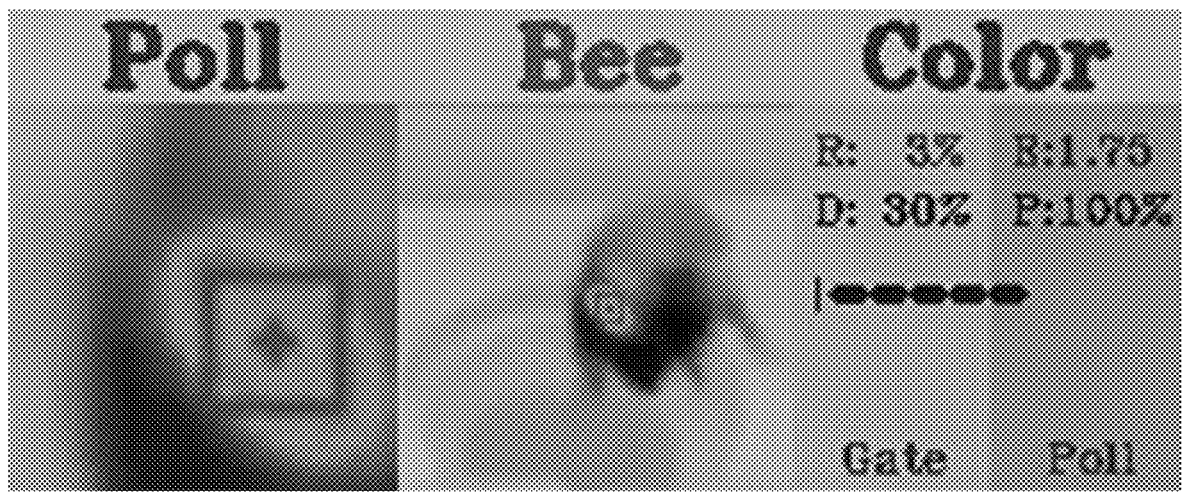
FIG. 9 represents an example of successfully identifying pollen in the apparatus for identifying pollen according to some embodiment of the present invention.

FIG. 9 represents an example of correctly identifying pollen in the apparatus for identifying pollen through training according to some embodiment of the present invention. It shows the bee box ('Bee'), pollen box ('Poll'), and color data of pollen ('Color').

By utilizing the learning data and comparing the IoU values, the bee's area is first identified in the image, and then the areas recognized as pollen within the bee's area are found. Subsequently, the contour is detected in the identified pollen area, and the information inside the contour is extracted.

The section of color data (Color) of pollen includes additional information such as the ratio of the bee and pollen area (i.e., the ratio of the bee box and pollen box) (R), the curvature of the contour (or the eccentricity of the ellipse) (E), the difference between pollen color and background or beehive color (D), and the color ratio inside the contour (P). The lower section indicated by the gate (Gate) represents information about the color of the beehive entrance inside the gate, and the section indicated by pollen (Poll) at the bottom represents information about the color of pollen. For measuring the color ratio (P), it may be quicker and more convenient to set a box (indicated by the red box) inscribed in the contour and measure the color distribution within that box.

FIG. 9 shows a case where the ratio of the bee and pollen area (R) is low at 3%, the difference between pollen color and background color (D) falls within a certain range, and the color ratio (P) inside the contour of pollen is relatively uniform (~100%). In this case, it is highly likely that the object is pollen.

Figure 10:
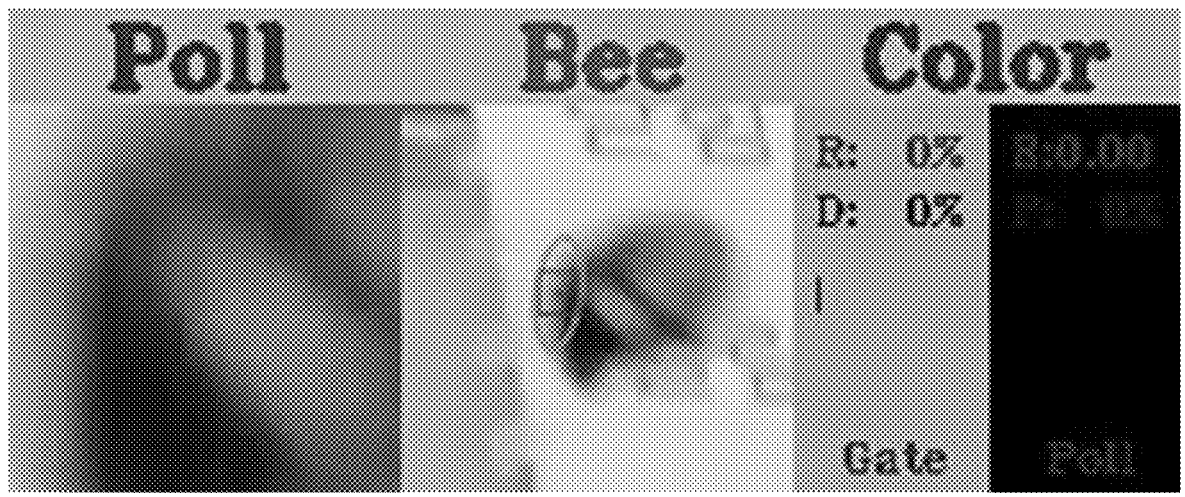
FIG. 10 represents an example of unsuccessfully identifying pollen in the apparatus for identifying pollen according to some embodiment of the present invention.

In contrast, FIG. 10 shows a case where the parameters (R, E, D, P) of the area initially considered pollen (indicated by the green contour) were examined and determined that it is not pollen. When an object is determined to be not pollen, as in FIG. 10, it may be convenient to replace the area indicated by "Poll" at the bottom of the color data (Color) with a specific color (e.g., black) that is easily distinguishable from pollen colors.

Figure 11:
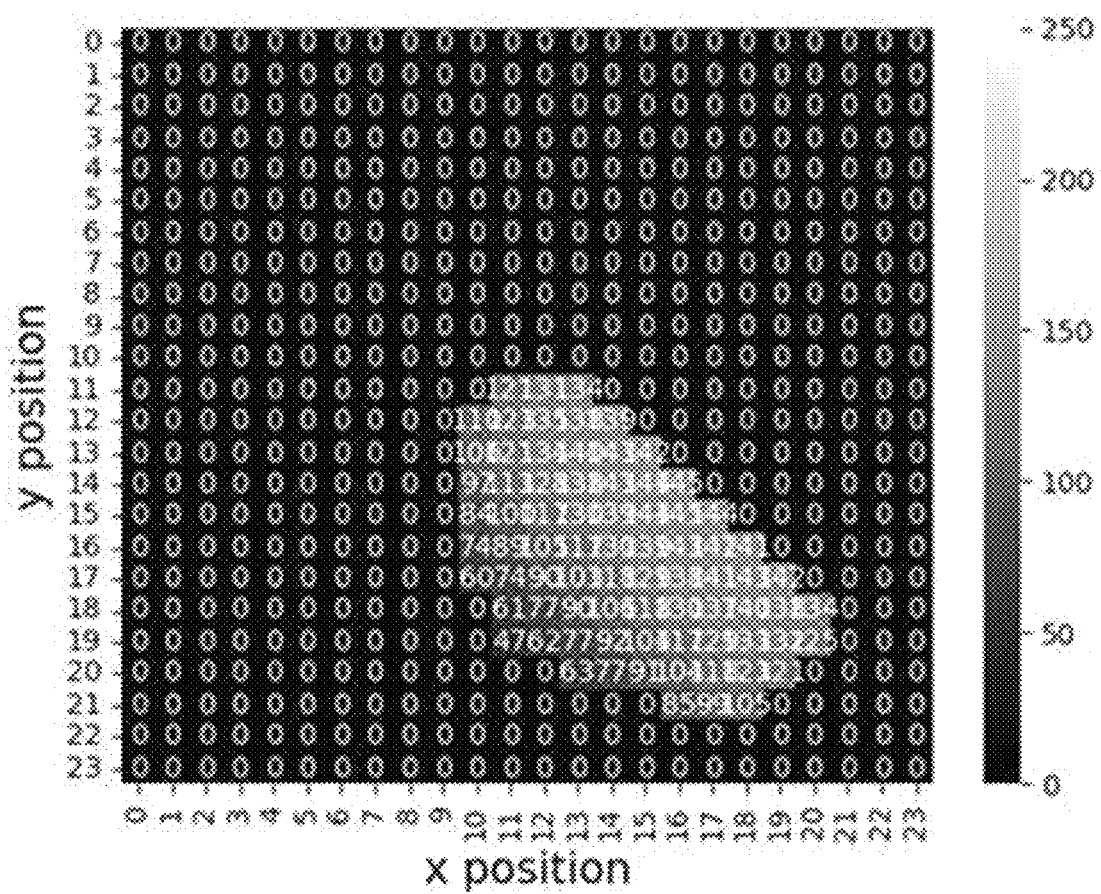
FIG. 11 displays an example of a binarized pollen image in the apparatus for identifying pollen according to some embodiment of the present invention.

FIG. 11 displays an example of a binarized pollen image obtained from the apparatus for identifying pollen according to some embodiment of the present invention.

By applying binarization to the image to standardize the size of color represented by R, G, and B to values between 0 and 255 and analyzing these values through numerical integration, the concentration and quantity of pollen can be quantitatively determined. FIG. 11 shows the result of extracting only the pollen area using the binarized values.

Compared to FIG. 9, it can be confirmed that only the color values inside the contour found in the pollen area were extracted. In FIG. 11, areas other than the pollen area are filled with '0' to avoid influencing the calculation of the amount of pollen. Since FIG. 11 represents the binarized image of the input video in real time, it enables quantitative analysis of the area recognized as pollen.

Figure 12:
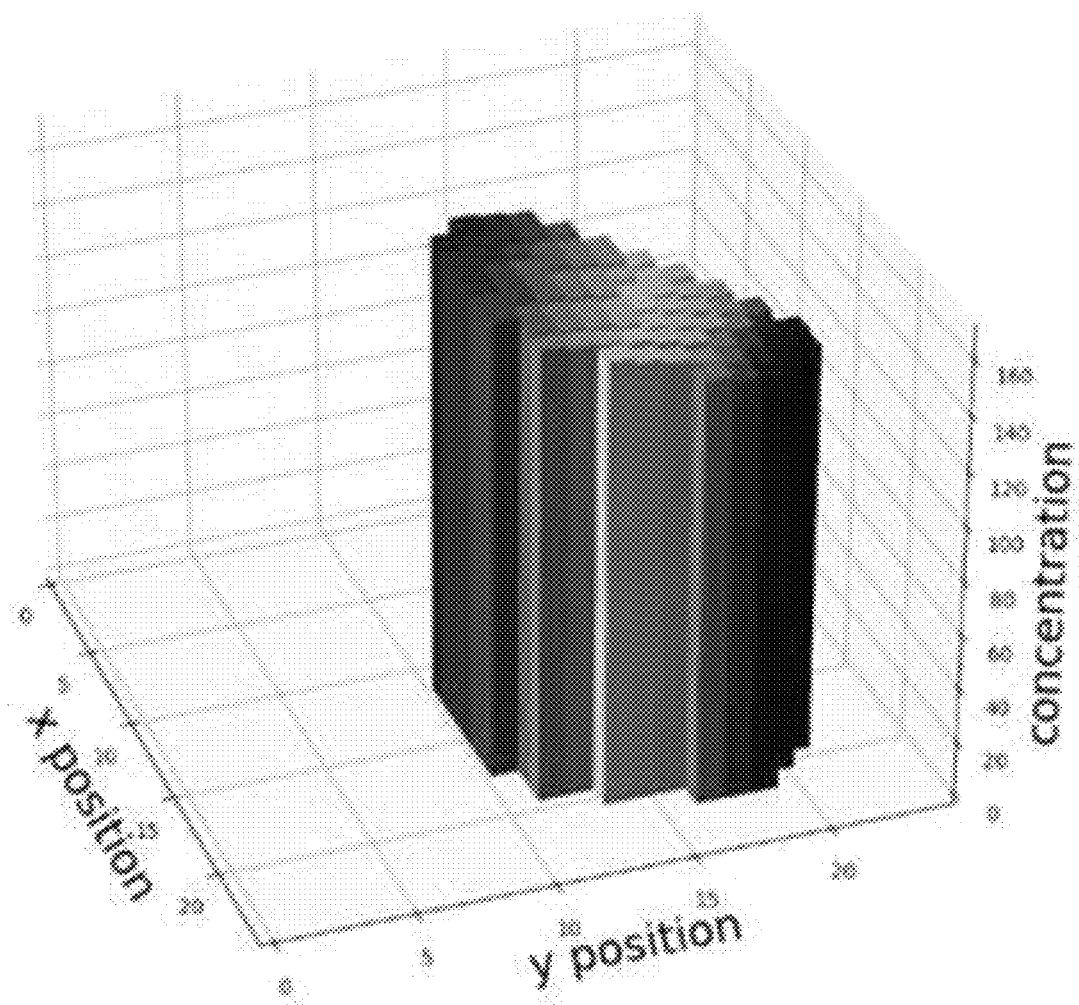
FIG. 12 demonstrates a quantitative analysis of pollen in the apparatus for identifying pollen according to some embodiment of the present invention.

FIG. 12 represents an example of quantitative analysis of pollen in the apparatus for identifying pollen through training according to some embodiment of the present invention.

FIG. 12 is a three-dimensional representation of the image in FIG. 11, where the concentration is shown on the Z-axis, and the color changes according to the concentration of pollen, allowing for easy observation of changes in concentration. This facilitates the identification of pollen distribution within the pollen contour.

Figure 13:
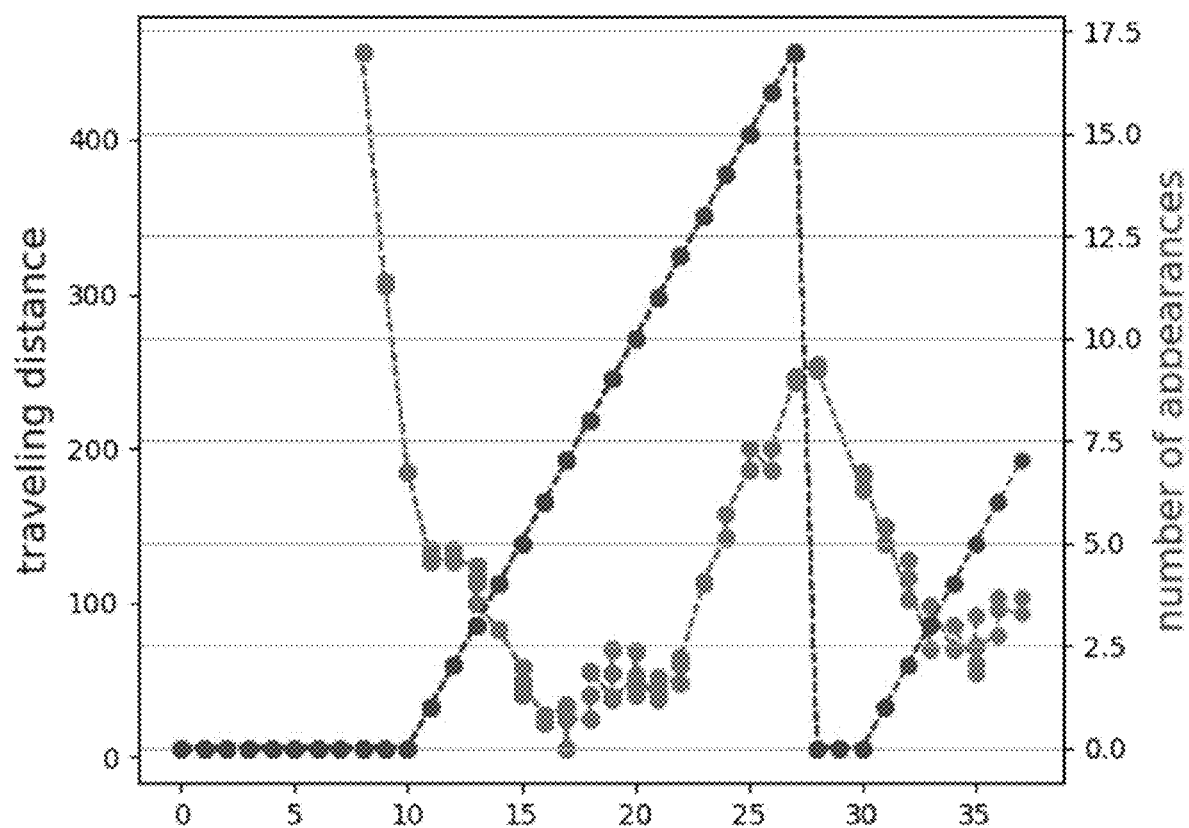
FIG. 13 is an analyzing diagram illustrating the bee's traveling distance and appearance frequency in the apparatus for identifying pollen according to some embodiment of the present invention.

Meanwhile, the apparatus of the present invention can analyze the captured video and generate a chart analyzing the trajectory of bees, as shown in FIG. 13.

FIG. 13 is an analyzing diagram illustrating the bee's traveling distance and appearance frequency in the apparatus for identifying pollen according to some embodiment of the present invention.

FIG. 13 is a trajectory chart showing the bee's traveling distance and appearance frequency. This allows for the understanding of the movements and status of bees by combining the trajectory line (blue), representing the traveling distance from the beehive's entrance to the bee box, and the appearance frequency line (red), representing the frequency of the bee box's appearance.

Figure 14:
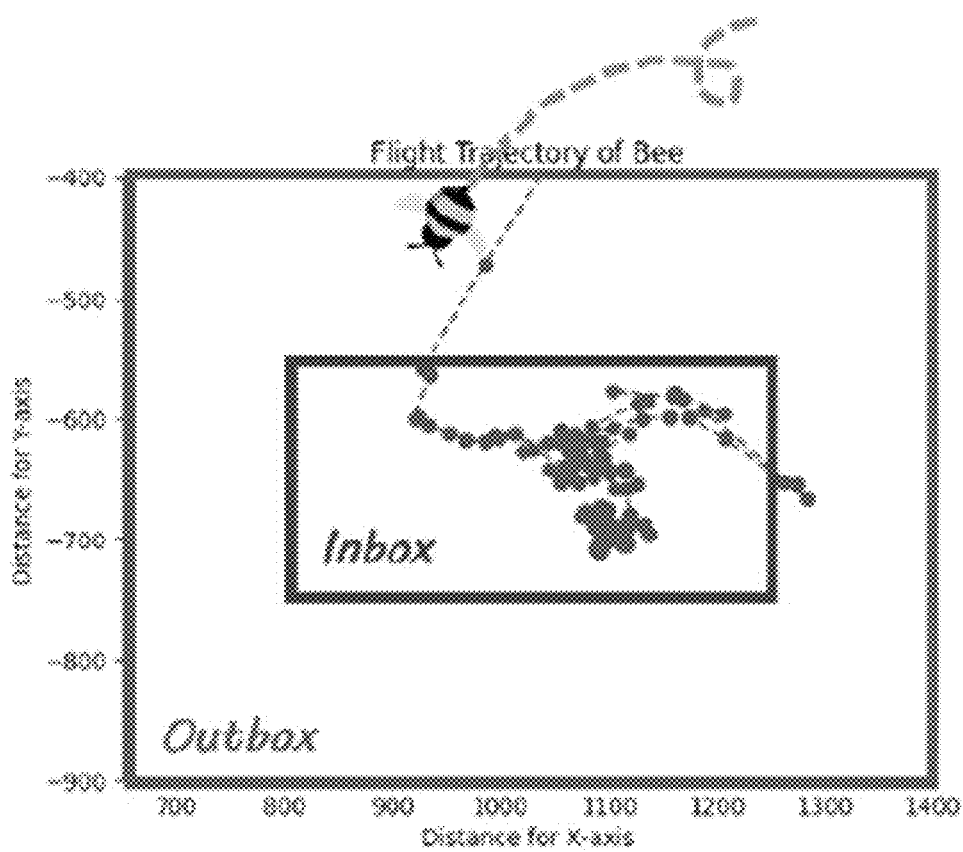
FIGS. 14 to 16 are exemplary diagrams showing the bee's trajectory tracking using the apparatus for identifying pollen according to some embodiment of the present invention.
Figure 15:
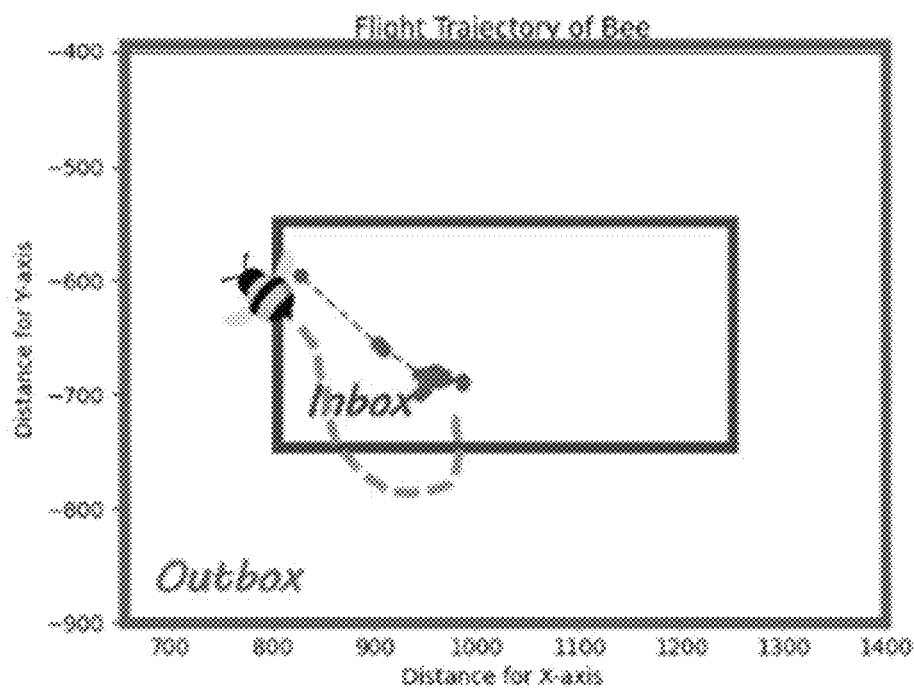
Figure 16:
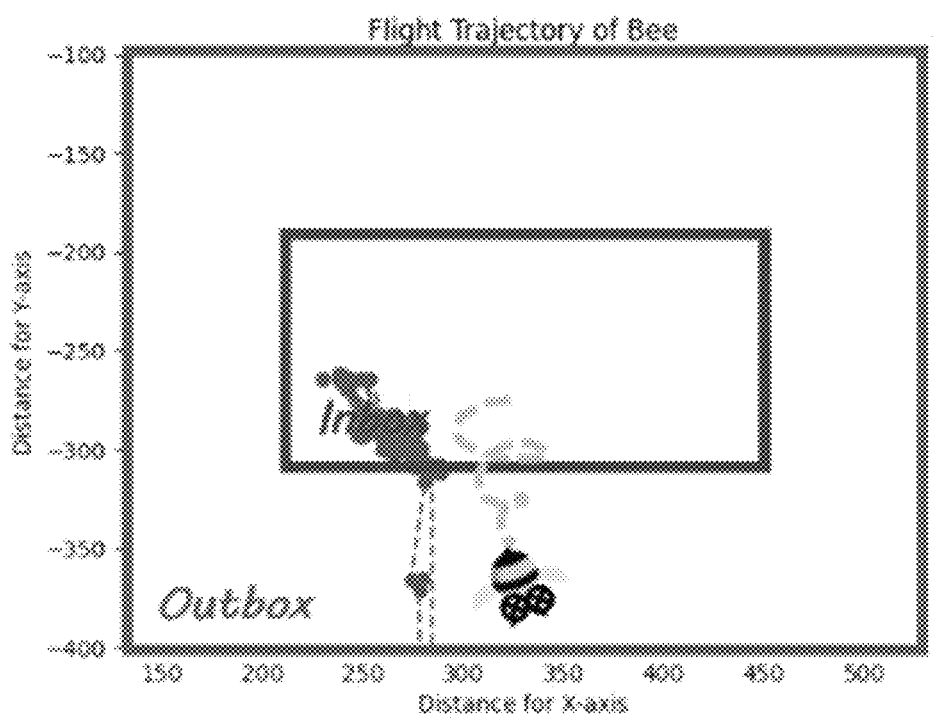

FIGS. 14 to 16 are exemplary diagrams showing the bee state analysis using the apparatus for identifying pollen according to some embodiment of the present invention.

By comparing the three diagrams, one can accurately distinguish the case where bees fall and die around the entrance area, as shown in FIG. 16, in contrast to the normal trajectories of bees entering the beehive (in FIG. 14) and exiting the beehive (in FIG. 15).

Although not shown in the accompanying drawings, the apparatus of the present invention can provide various forms of bee status analysis. For instance, it can provide a graph depicting the bee's flight trajectory in the X-Y coordinate system ("Flight Trajectory of Bee"), a graph indicating the cumulative appearance frequency of the bee within the video ("Observation of Bee's Staying"), a graph showing the bee's traveling distance from a reference point ("Traveling Distance of Bee") and the bee's appearance status.

Moreover, the apparatus of the present invention can measure the time bees enter and leave the beehive, allowing us to assess aspects such as aging and the activity level of bees. It can also learn or train data regarding the shape and color of pollen. Thus, it can distinguish the color of pollen in captured videos to determine if bees are visiting the intended types of plants or other types of plants. It can also assess whether bee movements are normal or abnormal. This information can provide insights into environmental changes and the suitability of bee foraging activities and assist in beehive and greenhouse management.

The embodiments and specific details described above are provided to facilitate a better understanding of the present invention. However, the present invention is not limited to these embodiments and can be subject to various modifications and variations by those skilled in the art based on their ordinary knowledge in the technical field to which the present invention belongs.

Therefore, the scope of the present invention should not be limited to the described embodiments but should encompass all modifications and variations that are within the scope of the principles disclosed in this specification.

The invention claimed is:

1. An apparatus for identifying pollen through learning, comprising:
    at least one processor configured to:
        store trained data obtained by training morphological characteristics of bees and the pollen using a deep learning model; and
        identify the bees and the pollen in a captured video using the captured video and the trained data,
    wherein the trained data further includes data for various types of the bees and the pollen, and the at least one processor is configured to use the trained data to set bee box in areas estimated to be the bees and pollen box in areas estimated to be the pollen, thus identifying the bees and the pollen separately,
    wherein the at least one processor is configured to determine the pollen box valid only if at least a portion of the pollen box exists inside the bee box while ignoring the pollen box located outside the bee box,
    wherein the at least one processor is configured to perform image processing on the captured video to detect boundaries, identify the boundaries predicted to be the pollen as contour lines of the pollen, and determine only the contour lines within the valid pollen box as the pollen,
    wherein the at least one processor is configured to set the contour lines as a baseline for determining color or concentration of the pollen, and wherein the at least one processor is configured to determine a presence of pollen based on at least one of an area ratio (R) of the bee box and pollen box, curvature (E) of the contour lines, difference (D) between the color of pollen and background color, and color ratio (P) within the contour lines.

2. The apparatus of claim 1,
wherein the at least one processor is configured to detect the boundaries through the image processing of the captured video and identify the boundaries of an area predicted to be pollen as the contour lines of the pollen.

3. The apparatus of claim 1,
wherein the at least one processor is configured to identify the presence of pollen based on intersection-over-union (IoU) value of the pollen box and the bee box.

4. The apparatus of claim 1,
wherein the at least one processor is configured to determine quantitatively the concentration or quantity of the pollen by applying binarization to an image within the pollen box to standardize the color values and analyzing the standardized color values through numerical integration.

5. The apparatus of claim 4,
wherein the at least one processor is configured to set the color values outside the contour lines in the pollen box to '0' during a binarization process.

6. The apparatus of claim 1,
wherein the at least one processor is configured to display distribution of pollen in three dimensions by representing color concentration of an image within the pollen box along a Z-axis.

7. The apparatus of claim 1,
wherein the at least one processor is configured to capture a video,
the at least one processor is configured to display the captured video,
and the at least one processor is configured to display the bee box, the pollen box, and the contour lines on the at least one processor.

8. An apparatus for identifying pollen through learning, comprising:
at least one processor configured to:
store trained data obtained by training morphological characteristics of bees and the pollen using a deep learning model; and
identify the bees and the pollen in a captured video using the captured video and the trained data,
wherein the trained data further includes data for various types of the bees and the pollen, and the at least one processor is configured to use the trained data to set bee box in areas estimated to be the bees and pollen box in areas estimated to be pollen, thus identifying the bees and the pollen separately,
wherein the at least one processor is configured to detect boundaries through image processing of the captured video, identify the boundaries predicted to be pollen as contour lines of the pollen, and determine only the contour lines within the pollen box as the pollen,
wherein the at least one processor is configured to set the contour lines as a baseline for determining color or concentration of the pollen, and
wherein the at least one processor is configured to determine a presence of pollen based on at least one of an area ratio (R) of the bee box and pollen box, curvature (E) of the contour lines, difference (D) between the color of pollen and background color, and color ratio (P) within the contour lines.

9. An apparatus for identifying pollen through learning, comprising:
at least one processor configured to:
store trained data obtained by training morphological characteristics of bees and the pollen using a deep learning model; and
identify the bees and the pollen in a captured video using the captured video and the trained data,
wherein the trained data further includes data for various types of the bees and the pollen, and the at least one processor is configured to use the trained data to set bee box in areas estimated to be the bees and pollen box in areas estimated to be the pollen, thus identifying the bees and the pollen separately,
wherein the at least one processor is configured to detect boundaries through image processing of the captured video, identify the boundaries predicted to be pollen as contour lines of the pollen, and determine only the contour lines within the bee box as the pollen,
wherein the at least one processor is configured to set the contour lines as a baseline for determining color or concentration of the pollen, and
wherein the at least one processor is configured to determine a presence of pollen based on at least one of an area ratio (R) of the bee box and pollen box, curvature (E) of the contour lines, difference (D) between the color of pollen and background color, and color ratio (P) within the contour lines.

10. An apparatus for identifying pollen through learning, comprising:
at least one processor configured to:
store trained data obtained by training morphological characteristics of bees and the pollen using a deep learning model; and
identify the bees and the pollen in a captured video using the captured video and the trained data,
wherein the trained data further includes data for various types of the bees and the pollen, and the at least one processor is configured to use the trained data to set bee box in areas estimated to be the bees and pollen box in areas estimated to be the pollen, thus identifying the bees and the pollen separately,
wherein the at least one processor is configured to determine the pollen box valid only if at least a portion of the pollen box exists inside the bee box while ignoring the pollen box located outside the bee box,
wherein the at least one processor is configured to perform image processing on the captured video to detect boundaries, identify the boundaries predicted to be the pollen as contour lines of the pollen, and determine only the contour lines within the valid pollen box as the pollen,
wherein the at least one processor is configured to set the contour lines as a baseline for determining color or concentration of the pollen,
wherein the at least one processor is configured to define a rectangle inscribed in the contour lines and set interior of the rectangle as target area for determining the color or concentration of the pollen, and
wherein the at least one processor is configured to determine a presence of pollen based on at least one of an area ratio (R) of the bee box and pollen box, curvature (E) of the contour lines, difference (D) between the color of pollen and background color, and color ratio (P) within the rectangle.

* * * * *